(12) United States Patent
Sharma et al.

(10) Patent No.: US 9,514,173 B2
(45) Date of Patent: Dec. 6, 2016

(54) REAL-TIME INDEX CONSISTENCY CHECK

(71) Applicant: Facebook, Inc., Menlo Park, CA (US)

(72) Inventors: Arun Dattaram Sharma, Union City, CA (US); Jinru He, Fremont, CA (US)

(73) Assignee: Facebook, Inc., Menlo Park, CA (US)

( * ) Notice: Subject to any disclaimer, the term of this patent is extended or adjusted under 35 U.S.C. 154(b) by 226 days.

(21) Appl. No.: 14/253,734

(22) Filed: Apr. 15, 2014

(65) Prior Publication Data
US 2015/0293960 A1    Oct. 15, 2015

(51) Int. Cl.
*G06F 17/30* (2006.01)
(52) U.S. Cl.
CPC ... *G06F 17/30336* (2013.01); *G06F 17/30371* (2013.01)
(58) Field of Classification Search
None
See application file for complete search history.

(56) References Cited

U.S. PATENT DOCUMENTS

| | | | | |
|---|---|---|---|---|
| 2003/0135495 A1* | 7/2003 | Vagnozzi | .......... | G06F 17/30324 |
| 2006/0026138 A1* | 2/2006 | Robertson | ......... | G06F 17/30631 |
| 2010/0205160 A1* | 8/2010 | Kumar | ............. | G06F 17/30336 707/696 |
| 2014/0188840 A1* | 7/2014 | Agarwal | ........... | G06F 17/30321 707/711 |
| 2015/0120642 A1* | 4/2015 | Spielberg | .......... | G06F 17/30592 707/602 |
| 2015/0142735 A1* | 5/2015 | Wang | ................ | G06F 17/30566 707/610 |

OTHER PUBLICATIONS

Chiueh et al., "Efficient real-time index updates in text retrieval systems", Experimental Computer Systems Lab, Department of Computer Science, State University of New York, 1999.*

Lempel et al., "Just in time indexing for up to the second search", Proceedings of the sixteenth ACM conference on Conference on information and knowledge management, ACM, 2007.*

* cited by examiner

*Primary Examiner* — Alex Gofman
*Assistant Examiner* — Umar Mian
(74) *Attorney, Agent, or Firm* — Perkins Coie LLP (57) ABSTRACT

A real-time index system is provided for maintaining the consistency of an index of a database. The real-time index system can receive data associated with an inconsistency detected in the index, compute an index key value from the received data, and obtain the index record and data record associated with the computed index key value. The real-time index system can further compare the data in the data record with the corresponding data in the index record to identify a mismatch in data between the data in the index record and the data in the data record. The real-time index system can maintain the consistency of the index by modifying a portion of data in the index record to be consistent with a corresponding portion of data in the data record.

20 Claims, 8 Drawing Sheets

REAL-TIME INDEX CONSISTENCY CHECK

TECHNICAL FIELD

This patent application generally relates to database management software, and more specifically to maintaining a generally consistent, near real-time index for the data stored in a database

BACKGROUND

The Background section of this document is provided to place embodiments of the disclosed technology in technological and operational context to assist those of skill in the art in understanding their scope and utility. Unless explicitly identified as such, no statement herein is admitted to be prior art merely by its inclusion in the Background section.

Databases are employed in various demanding applications, including search engines, corporate billing applications, customer relationship management, and so on. Such applications demand versatile databases and accompanying mechanisms that can quickly access, insert, and modify data (called input/output or I/O operations) in the databases with minimal use of computing resources. For the purposes of the present discussion, a database may be any collection of data stored in a computing system in digital form. As database sizes increase, increased emphasis is placed on efficient database design to minimize an amount of some computing resources (e.g., processor time, memory, etc.) required to perform I/O operations.

To reduce the time to access data in a database, indexes are utilized. However, the speed with which a database creates one or more indexes for the data stored within the database is very slow. Further, the database indexes are not updated in real-time and those available for a recently stored data are likely to be inconsistent with the stored data. For example, when a user stores a photo in the database and the index associated with the stored photo is not updated in real-time, any search query for the photos of the user that utilizes the index will provide an out-of-date list of photos of the user.

In addition, the database indexes must often be maintained using extensive resource every time data is updated or modified. This process can often result in indexes not being updated properly, leading to out-of-sync (i.e., inconsistent) indexes that do not fully index the data stored within the database. In the present art, such out-of-sync indexes are only fixed when the indexes are completely rebuilt. There are no known means to fix such inconsistent indexes in real-time without requiring a complete rebuild of the indexes.

BRIEF DESCRIPTION OF THE DRAWINGS

The techniques introduced here may be better understood by referring to the following Detailed Description in conjunction with the accompanying drawings, in which like reference numerals indicate identical or functionally similar elements.

The headings provided herein are for convenience only and do not necessarily affect the scope or meaning of the claimed embodiments. Further, The drawings have not necessarily been drawn to scale. For example, the dimensions of some of the elements in the figures may be expanded or reduced to help improve the understanding of the embodiments. Similarly, some components and/or operations may be separated into different blocks or combined into a single block for the purposes of discussion of some of the embodiments. Moreover, while the various embodiments are amenable to various modifications and alternative forms, specific embodiments have been shown by way of example in the drawings and are described in detail below. The intention, however, is not to limit the particular embodiments described. On the contrary, the embodiments are intended to cover all modifications, equivalents, and alternatives falling within the scope of the disclosed embodiments as defined by the appended claims.

DETAILED DESCRIPTION

Overview

A real-time index system is disclosed for maintaining consistency of an index of a database. In various embodiments, the real-time index system receives data associated with an inconsistency detected in the index. The detected inconsistency is associated with a mismatch between a portion of data in a data record and a corresponding data in an index record of the index, where a database table associated with the database includes multiple data records. Further, the index includes multiple index records.

The real-time index system computes an index key value from the received data, where the index key value includes an index attribute and a value for the index attribute. The index key value is associated with the index record that includes the index attribute with the index attribute value corresponding to the value in the index key value. The index record further includes a reference to the data record in the database table associated with the index record.

The real-time index system obtains the index record associated with the computed index key value and the data record associated with the reference in the index record. The real-time index system compares the data in the data record with a corresponding data in the index record to identify the portion of data in the data record that has a mismatch with the corresponding portion of data in the index record. The real-time index system modifies the corresponding portion of data in the index record to be consistent with the portion of data in the data record to maintain the consistency of the index.

The real-time index system detects inconsistency in the index using various methods. In a first method, the real-time index system compares the consistency of data in a data record that is accessed by a query with that of a corresponding index record in the index to detect possible inconsistencies in the index. When the real-time index system receives a query to access a content stored within the database, the real-time index system gathers/computes an index key value included in received query. The content stored within the database is associated with a data record of the multiple data records in the database table.

The real-time index system identifies the index record associated with the index key value and compares the data in the data record with a corresponding data in the index record to identify any possible mismatch between the portion of data in the data record with the corresponding portion of data in the index record. The real-time index system detects the identified mismatch as an inconsistency in the index.

In some embodiments, the real-time index system flags a possible inconsistency in the index when an update of the index triggered in response to the change in data stored in the database is unable to be performed. When the real-time index system receives an update data from the database in response to a change in data of a data record stored in the database table, the real-time index system obtains the index record associated with the data record using an index key value included in the update data. The real-time index system obtains the index record to modify the data corresponding to the portion of data of the data record.

The real-time index system further queries the database (or other data sources) to access the portion of data of the data record to modify the corresponding data in the index record. When access to the portion of data of the data record is not provided, the real-time index system stops updating the index record and identifies the portion of data in the data record as having a mismatch with the corresponding data in the index record. The real-time index system detects the identified mismatch as the inconsistency in the index.

In a third method, the real-time index system flags a possible inconsistency in the index when an update of the index triggered in response to the change in data stored in the database is unable to be performed. When the real-time index system receives an update data from the database in response to a change in data of a data record stored in the database table, the real-time index system queries an index system to access the index record associated with the data record.

The real-time index system requests access to the index record to modify the data in the index record corresponding to the changed data in the data record. When access to the index record is not provided, the real-time index system stops updating the index record and identifies the portion of data in the data record as having a mismatch with the corresponding data in the index record. The real-time index system detects the identified mismatch as the inconsistency in the index.

General Description

Various examples of the techniques introduced above will now be described in further detail. The following description provides specific details for a thorough understanding and enabling description of these examples. One skilled in the relevant art will understand, however, that the techniques discussed herein may be practiced without many of these details. Likewise, one skilled in the relevant art will also understand that the techniques can include many other obvious features not described in detail herein. Additionally, some well-known structures or functions may not be shown or described in detail below, so as to avoid unnecessarily obscuring the relevant description.

The terminology used below is to be interpreted in its broadest reasonable manner, even though it is being used in conjunction with a detailed description of certain specific examples of the embodiments. Indeed, certain terms may even be emphasized below; however, any terminology intended to be interpreted in any restricted manner will be overtly and specifically defined as such in this section.

Figure 1:
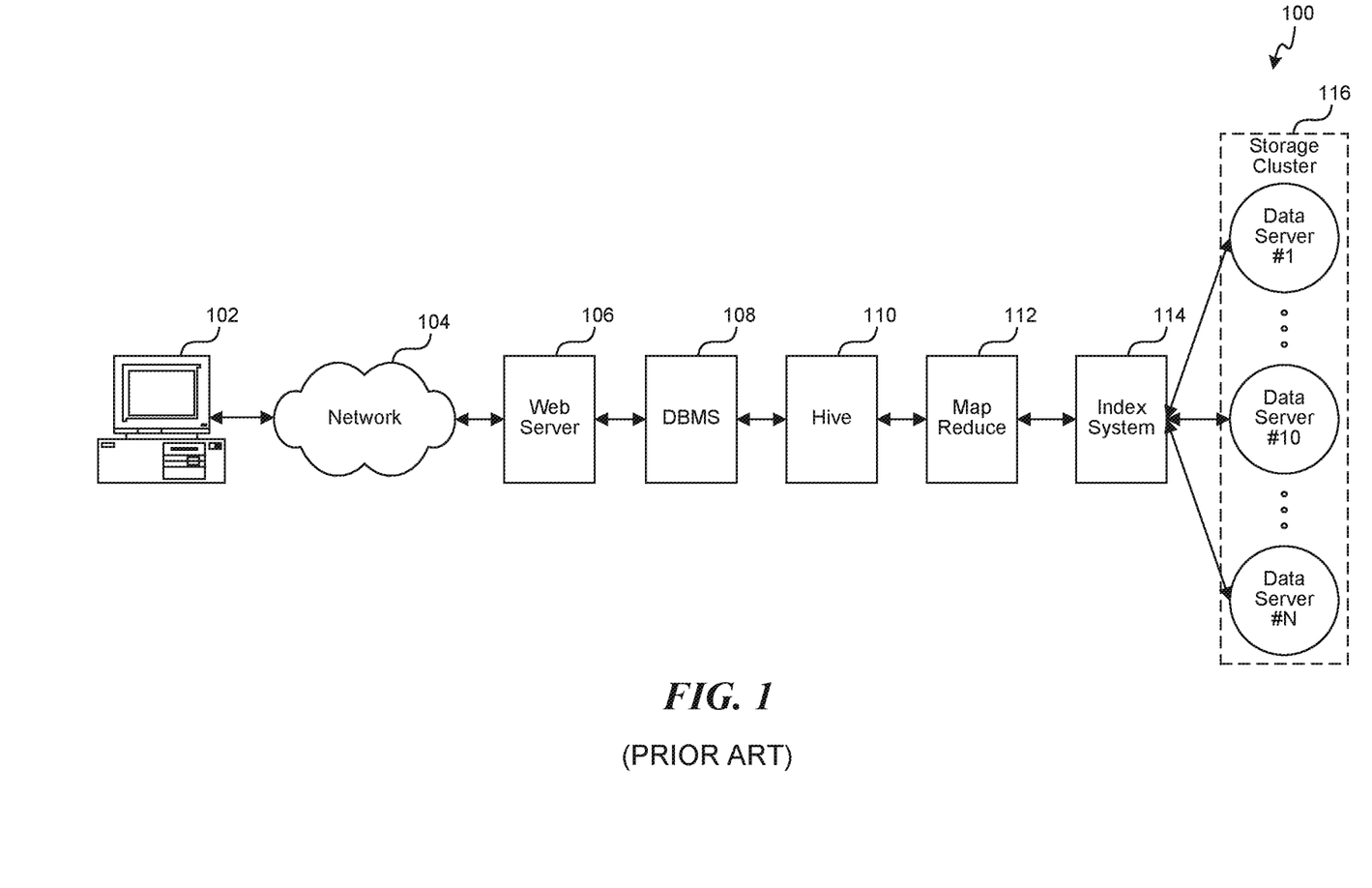
FIG. 1 is a block diagram illustrating a data storage environment with a database that implements a DBMS and an index system to store and manage the data stored within a storage cluster.

Several embodiments of the disclosed real-time index system are described in more detail in reference to the Figures. Turning now to Figures, FIG. 1 is a block diagram illustrating a data storage environment 100 with a database that implements a DBMS 108 and an index system 114 to store and manages the data stored within the storage cluster 116. The data being stored using the database can be received from a user device 102 interacting with the DBMS 108 through a webserver 106 over a network 104. The network can be, for example, the internet. The DBMS 108 gathers and stores a portion of the stored data, e.g., metadata associated with the stored data, in a database table within the DBMS 108.

For example, when the data stored in the database is a photo taken by the user device 102, the metadata associated with the photo, e.g., the timestamp of when the photo was taken, location of where the photo was taken, the user id of user who uploaded the photo, etc., is stored in a database table within DBMS 108. The DBMS 108 forwards the content of the stored photo the Hive Interface 110 to be indexed using a MapReduce System 112 (e.g., Hadoop).

Hive Interface 110 provides tools that enable data summarization, adhoc querying and analysis of stored content as well as a mechanism to impose structure on the stored content. Hive Interface 110 also provides a simple query language called QL or HiveQL, to do adhoc querying, summarization and data analysis. In addition, Hive 110 coverts HiveQL query commands into MapReduce 112 jobs that process the associated content files stored in HDFS. For example, the MapReduce 112 jobs generate various indexes for the content files of the index system 114. The content files are then stored as data blocks in the various data servers #1-#n in the storage cluster 116.

In the system illustrated in FIG. 1, in order to update an index, the index system 114 must re-generate the indexes. As discussed above, this process is computationally expensive and time-consuming.

Figure 2:
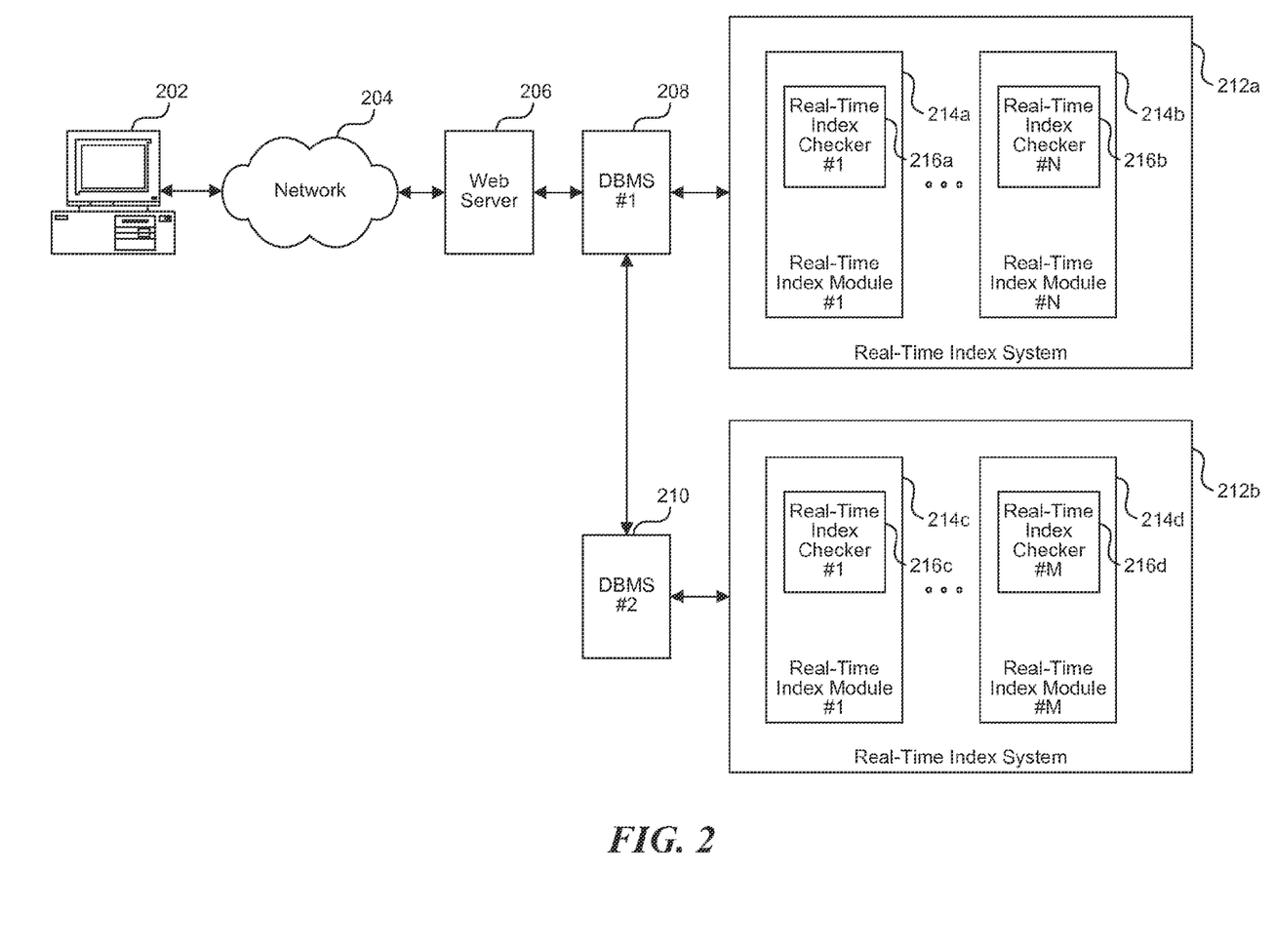
FIG. 2 is a block diagram illustrating a distributed storage environment in which the real-time index system can operate in various embodiments.

FIG. 2 is a block diagram illustrating a distributed storage environment 200 in which the real-time index system can operate in various embodiments. It should be noted that the described real-time index system can be implemented in other storage environments and the real-time index system's operation should not be considered limited to the distributed storage environment 200 illustrated in FIG. 2.

The distributed storage environment 200 comprises a database that includes multiple DBMS 208, 210 and multiple real-time index systems 212a, 212b to store and manage the data stored using the database. The data being stored using the database can be received from a user device 202 interacting with the DBMS 208 through a webserver 206 over a communication network 204. The communication network can be, for example, a Local Area Network (LAN), Wide Area Network (WAN), or the Internet.

In some embodiments, each DBMS 208, 210 works in conjunction with a corresponding real-time index system 212a, 212b to index the data stored using the database. Further, each DBMS 208, 210 and real-time index system 212a, 212b pair function as a backup for the database tables and indexes stored in another DBMS 208, 210 and real-time index system 212a, 212b pair, respectively. In some embodiments, the DBMS 208, 210 gathers and stores a portion of a stored data, e.g., metadata associated with the stored data, in a database table within the DBMS 208, 210.

When data is stored, modified, or removed from the database, in some embodiments, the DBMS 208, 210 modifies data records storing the metadata associated with the data in the database tables in the DBMS 208, 210. The modification of data records in the database table includes creation of new data records, deletion of existing data records, modification of content in any of the various fields of existing data records, etc. In some embodiments, the DBMS 208, 210 transmits a data stream with information pertaining to the modified data records and any updated data corresponding to each modified data record.

In some embodiments, the data stream is provided to other DBMS 208, 210 that function as a backup for or a local instance of the data records and database tables stored in a particular DBMS 208, 210. For example, the data stream can include an employee record identifier, e.g., an employee id, to identify a particular employee's record in a database table storing employee personal information. Further, the data stream can include any changes to the information stored in the data record, e.g., a change in home address of the employee.

In some embodiments, the DBMS 208, 210 acting as a backup for a particular DBMS 208, 210 utilizes the received data stream to modify any backup data records storing the metadata associated with the data in the backup database tables in the DBMS 208, 210. For example, as described above, a received data stream can include an employee's id and a change in home address of the employee. The DBMS 208, 210 can utilize the employee's id to identify the particular data record with an matching employee id and update the home address field in the data record with the received home address in the data stream.

In some embodiments, the DBMS 208, 210 transmits the data stream (either received by the DBMS 208, 210 or generated by the DBMS 208, 210) to a corresponding real-time index system 212a, 212b that manages the indexes for the database tables stored in the DBMS 208, 210. The following discussion provides a description of the real-time index system 212a and its various sub-components, and the real-time index module 214a and its various sub-components. It should be noted that the description of the real-time index system 212a and its various sub-components, and the real-time index module 214a and its various sub-components including real-time index checker module 216a are equally applicable to other real-time index system 212b and real-time index module 214b-214d, respectively, in the distributed storage environment 100.

In some embodiments, the real-time index system ("RTIS") 212a includes multiple real-time index modules ("RTIM") 214a to generate and store indexes for the database tables stored in the DBMS 208. In some embodiments, each RTIM 214a generates and stores indexes for a portion of the data records in the database tables. By using multiple RTIMs 214a-214b to split and manage the indexes, the RTIS 212a improves the throughput of servicing query requests that access the indexes in parallel and the reliability by enabling the indexes to still be accessible when one or more of the RTIMs 214a-214b suffers a hardware/software malfunction.

Figure 3:
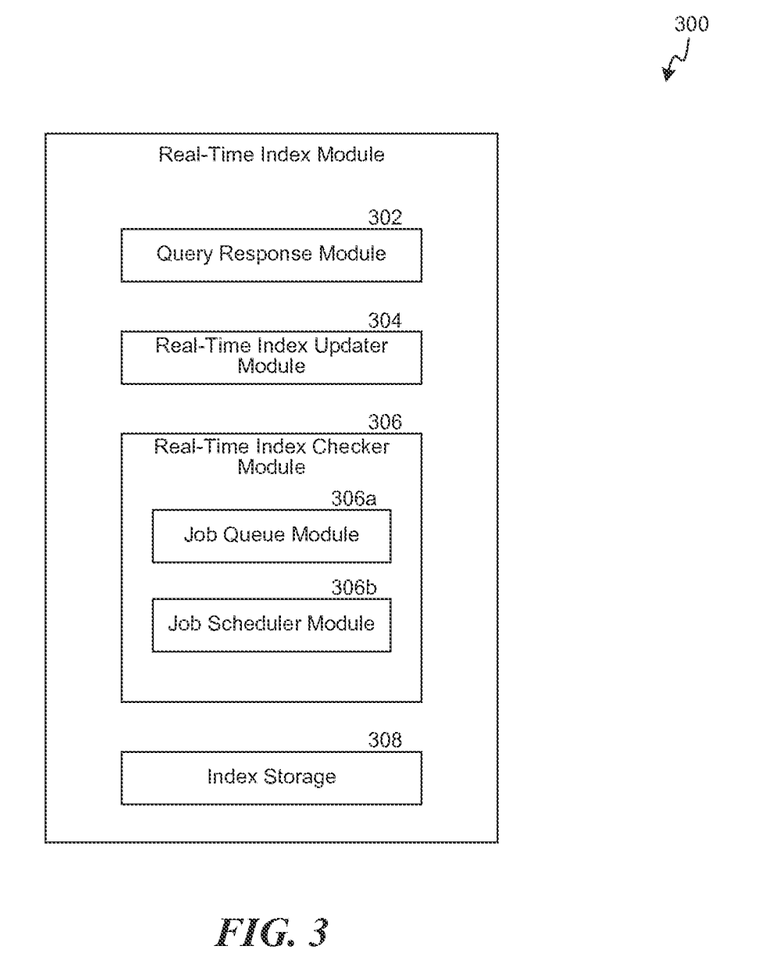
FIG. 3 is a block diagram providing an illustrative real-time indexing module and its various sub-components.

Turning now to FIG. 3, FIG. 3 is a block diagram providing an illustrative RTIM 300 and its various sub-components. In some embodiments, the RTIM 300 includes a query response module 302, a real-time index updater module 304, a real-time index checker module 306 and an index storage 308. In some embodiments, the RTIM 300 uses the index storage 308 to generate and store the various indexes for the portion of the data records of the database table the RTIM 300 is responsible for. As discussed above, the generated and stored indexes may correspond to one or more columns or rows of a database table. Indexes may also store results of certain functions or conditional expressions specifying a predetermined characteristic of data records or fields, e.g., fields with certain date ranges, value ranges, instances of capital letters, etc.

In some embodiments, the query response module 302 receives queries requesting access to a select portion of the data stored in the database. The query response module 302 utilizes the various indexes stored in the index storage 308 to identify the data records associated with the select portion of the data being accessed through the query. For example, when the received query requests access to all personal information of employees with a particular first name, the query response module 302 utilizes an alphabetically sorted index that maps the first name of the employees to their respective data records to quickly identify those data records of the employees with the particular first name.

In some embodiments, the query response module 302 performs a consistency check of the data stored in the database and the associated index in the index storage 308. In some embodiments, the query response module 302 compares the consistency of data in a data record that is accessed by a query with that of a corresponding index record in the index to detect possible inconsistency in the index.

Figure 5:
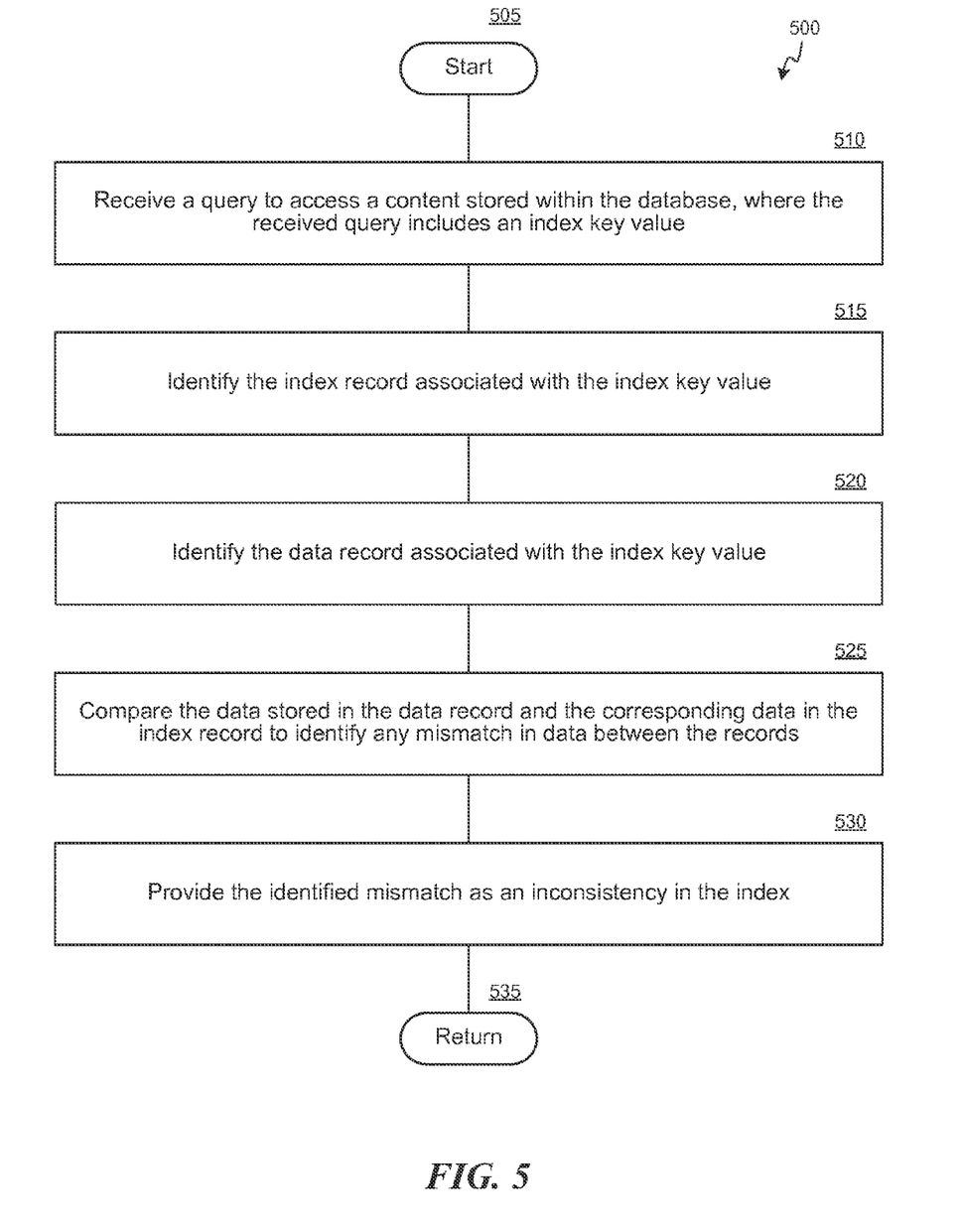
FIG. 5 is a flow chart of a method to identify inconsistency in an index using the data gathered in response to a received query.

Turning briefly to FIG. 5, FIG. 5 is a flow chart of a method 500 to identify inconsistency in an index using the data gathered in response to a received query. In some embodiments, the method 500 is implemented by the query response module 302. The method starts at block 505. At block 510, a query to access a content stored within the database is received, where the received query includes an index key value. The index key value is used to identify particular data records and associated index records. In embodiments, the index key value is a combination of a particular column field in a data record and a value for the particular column field. For example, the index key value can correspond to the employee id field with a particular employee id number.

At block 515, the index record associated with the index key value is identified. In embodiments, the index records in a particular index associated with the queried data records that contain matching index key values are identified. For example, the index key value that corresponds to employee id field with a particular employee id number can be used to identify particular index records with a matching particular employee id in an index sorted numerically by employee id.

At block 520, the data record associated with the index key value are identified. In embodiments, the queried data records in a database table are identified using the index key value in the query. In some embodiments, the database tables are searched for data records with matching index key values. In some embodiments, the reference to the data records included in the identified index records are used to queried data records associated with the index key value.

At block 525, the data in the data record is compared with corresponding data in the index record to identify any possible mismatch between the portion of data in the data record with the corresponding portion of data in the index record. For instance, data in the data record and the index record are compared by fields to perform the comparison. For example, in an index that indexes the personal information fields of employee id and first name of employees, the employee id and the corresponding first name of the employee in a particular index record will be compared to the employee id and the corresponding first name of the employee in a data record with the matching employee id.

At block 530, any identified mismatch in information stored in the index to that stored in the data record as determined by the comparison in block 525 is flagged as an inconsistency in the index. The method returns at block 535. Those skilled in the art will appreciate that the logic illustrated in FIG. 5 and described above, and in each of the flow diagrams discussed below, may be altered in various ways. For example, the order of the logic may be rearranged, substeps may be performed in parallel, illustrated logic may be omitted, other logic may be included, etc.

Returning to FIG. 3, in some embodiments, the query response module 302 notifies the real-time index checker module 306 of any identified inconsistency in the index. In embodiments, the real-time index checker module 306 utilizes the information provided in the notification to fix any identified inconsistency in the index and maintain the index in a consistent state (with respect to the data in the data records or other reliable sources of the data).

In some embodiments, the query response module 302 notifies a job queue module 306a in the real-time index checker module 306 of any identified inconsistency in the index. The query response module 302 includes the index key value, e.g., employee id, and the associated index, e.g., numerically sorted index of the employee id, of the various indexes stored in the index storage 308 in the notification provided to the job queue module 306a.

In some embodiments, the job queue module 306a maintains a job queue with a list of jobs pertaining to the various inconsistencies identified in the index. In some embodiments, the job queue module 306a transforms a notification received of an identified inconsistency in the index into a job and places the job in the job queue. In some embodiments, the job queue module 306a includes any received index key value and associated index information in the various information provided for a particular job placed in the job queue.

In some embodiments, the various jobs in the job queue are performed by a job scheduler module 306b, where performing a particular job requires fixing the inconsistency in the index identified by the information in the particular job. In embodiments, the job queue module 306a maintains a priority order amongst the various jobs in the job queue to provide an order in which to perform the various jobs by the job scheduler module 306b. The priority order can be implemented using any well-known algorithm for managing multiple jobs with limited resources.

In some embodiments, the job scheduler module 306b is implemented as a process with various job threads running within the process to maintain the consistency of the indexes in the index storage 308. In some embodiments, each job thread performs a given job in the job queue independently of each other to restore the consistency of the data between the index and the data records (or other sources of the data). A job thread is a conveniently sized collection of programming steps that are scheduled and executed as a group. In some embodiments, the job thread runs within a job scheduler module process and shares resources, e.g., memory, with other threads within the same process, where the job scheduler module process generally runs 'self-contained' within its own right and completely independently of any other process.

In some embodiments, the job scheduler module 306b assigns a job from the job queue to each of the available threads. Once a thread completes restoring the consistency of the data between the index and the data records identified in its assigned job, the thread returns to the job queue to perform the next available job in the job queue. In some embodiments, the job thread restores the consistency of the data between the index and the data records identified in its assigned job by comparing the data in the data records and the index records of the index and updating the data in the index records to be consistent with the data in the data records.

Figure 4:
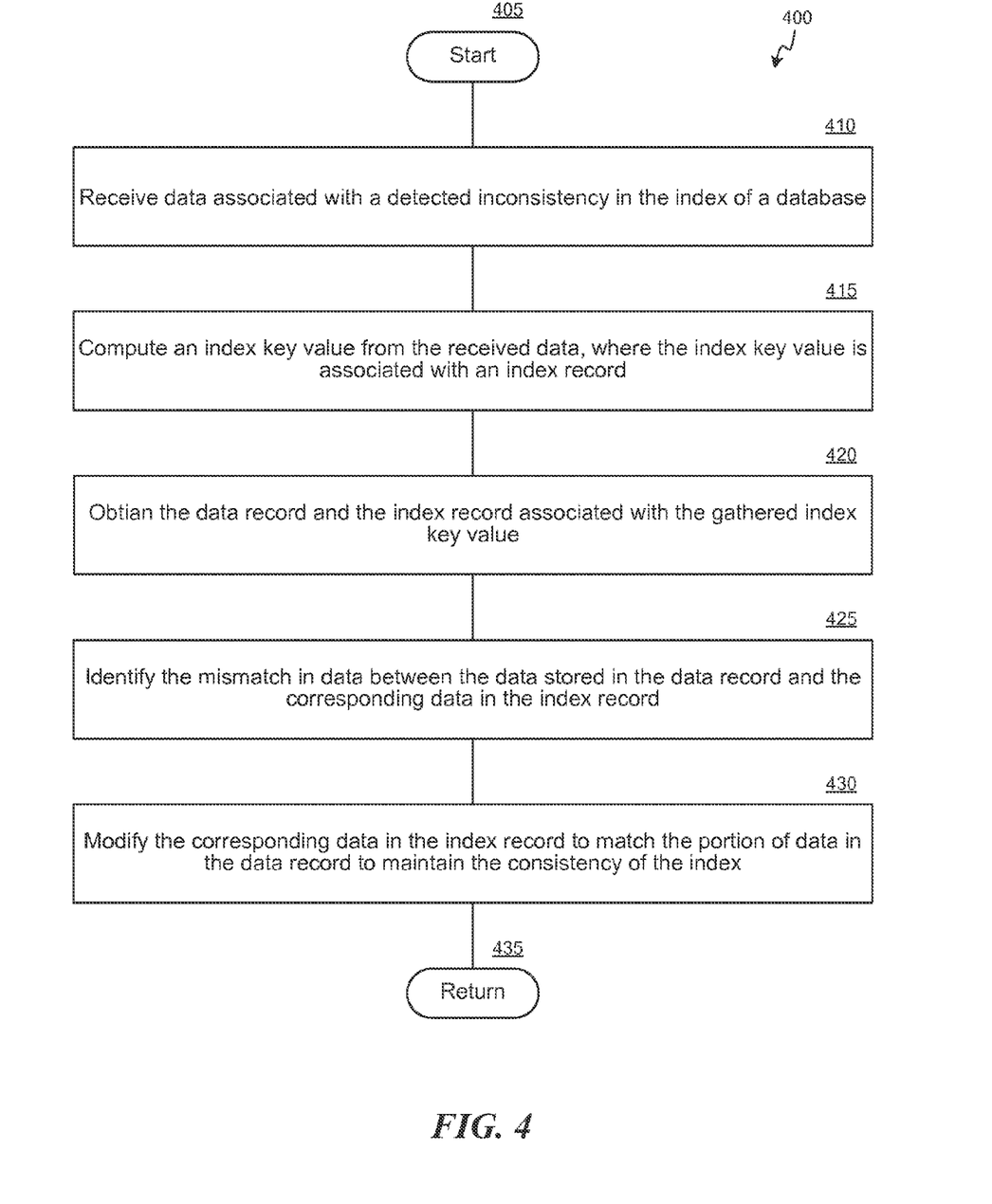
FIG. 4 is a flow chart illustrating a method for maintaining the consistency of an index.

Turning briefly to FIG. 4, FIG. 4 is a flow chart illustrating a method 400 for maintaining the consistency of an index. In some embodiments, the method 400 can be performed by the job thread of the job scheduler module 306b to restore and maintain the consistency of the index. The method 400 starts at block 405. At block 410, data associated with an inconsistency detected in the index is received. For example, a job in the job queue includes various information, e.g., index key value, associated index, etc., associated with the inconsistency detected in the index.

At block 415, the index key value from the received data is gathered. At block 420, any index record associated with the index key value and the data record associated with the index key value are gathered/computed. In embodiments, the data record associated with the index key value are obtained by using the reference to the data record included in the obtained index record.

At block 425, the data in the data record is compared with a corresponding data in the index record to identify the portion of data in the data record that has a mismatch with the corresponding portion of data in the index record. For the comparison, any well-known algorithm can be utilized to perform a comparison of data by data type. At block 430, the corresponding portion of data in the index record is modified to be consistent with the portion of data in the data record to maintain the consistency of the index. For example, when the first name of an employee in the index record mismatches with the first name of the employee on the data record, the first name in the index record is updated to be consistent with the first name of the employee on the data record.

Returning to FIG. 3, in some embodiments, the job scheduler module 306b analyzes the job in the job queue to determine whether the job pertains to an identified inconsistency in the index records maintained in the index storage 308 of RTIM 300. As discussed above, the RTIS 212a, 212b includes multiple RTIMs 300, where each RTIM 300 is responsible for indexing a portion of the data records in the database tables stored in DBMS 208, 210. When a RTIM 300 receives a request to address the consistency of an index pertaining to a portion of data records for which the RTIM 300 is not responsible for, the RTIM 300 forwards the request to the appropriate RTIM 300 maintaining the index pertaining to the portion of data records identified in the request.

In some embodiments, the job scheduler module 306b of the RTIM 300 forwards a job request to another job scheduler module 306b in another RTIM 300 that maintains the indexes associated with the data records references in the job request. For example, when the indexes in the index storage 308 only index data records of employees within an employee id with a given range, the job scheduler module 306b forwards any job request with reference to employee id that falls outside the range maintained in the index storage 308.

In some embodiments, a job thread of the job scheduler module 306b retrieves a job from the job queue and analyzes the job to determine whether the job pertains to an identified inconsistency in the index records maintained in the index storage 308 of RTIM 300. When the job thread determines the job should be forwarded to another job scheduler module 306b in another RTIM 300, the job thread determines the identity of the other RTIM 300 the job should be forwarded to. In some embodiments, a mapping information of the data records indexed by the various RTIM 300 is maintained in each RTIM 300 to enable identification of the appropriate RTIM 300 to forward the job to.

In some embodiments, the job thread forwards the job to all the RTIMs 300 in the RTIS 212a, 212b and listens for a confirmation from the appropriate RTIM 300 of reception of the job. In some embodiments, when the job is successfully received, the job thread returns to the job queue to perform the next job in the job queue. In some embodiments, when the job cannot be successfully forwarded, the job thread places the job back in the job queue and perform the next job in the job queue. A job cannot be successfully forwarded to the intended RTIM 300 when, for instance, the intended RTIM 300 is suffering a hardware/software malfunction.

In some embodiments, the RTIM 300 includes a real-time index updater module 304 to receive data streams transmitted from the DBMS 208, 210 and update the indexes stored in the index storage 308 using the received data streams. As discussed above, the transmitted data stream includes information pertaining to the modified data records and any updated data corresponding to each modified data record. For example, the data stream can include an employee id of a particular employee and any changes to the information of the particular employee stored in the data record, e.g., a change in home address of the employee.

In some embodiments, the real-time index updater module 304 utilizes the received information to identify the particular indexes that include index records with data associated with the modified data records. The real-time index updater module 304 utilizes the data in the data stream to updates those identified index records with to be consistent with the data in associated data records. In some embodiments, the real-time index updater module 304 queries the DBMS 208, 210 or other data sources to the determine the data that needs to be changed in the identified index records.

When the DBMS 208, 210 or other data sources fail to provide the real-time index updater module 304 with the requested data, in some embodiments, the real-time index updater module 304 stops updating the identified index records and provides the information received in the data stream to the job queue module 306a. The job queue module 306a creates a job based on the received information and places the job in the job queue, where the job is eventually performed by one of the job threads in the job scheduler module 306b.

In some embodiments, the real-time index checker module 306 tracks the identified inconsistencies in the various index records of the index and determines the number of index records accessed within a particular timeframe which have been identified with inconsistencies. In embodiments, the accessed index records include those records which were created, deleted, modified, etc. In some embodiments, the real-time index checker module 306 utilizes a timestamp maintained by the index of the last access time of each of the index record in the index to determine the index records that were accessed within a particular timeframe. The particular timeframe can be a predefined window of time, e.g., a half hour window of time. When determining the number of index records accessed within the particular timeframe, all the index records in the index which were accessed relative to each other within the predefined window are grouped together.

In some embodiments, the real-time index checker module 306 determines whether the number of index records within a particular timeframe with identified inconsistencies exceed a predefined threshold, e.g., a predefined percentage of index records accessed within the particular timeframe. When the number of index records within a particular timeframe with identified inconsistencies exceed a predefined threshold, in some embodiments, the real-time index checker module 306 flags all the index records accessed within the particular timeframe as having potential inconsistency. In some embodiments, the real-time index checker module 306 performs a consistency check of the flagged index records using the job queue module 306a and the job scheduler module 306b as described earlier.

Figure 6:
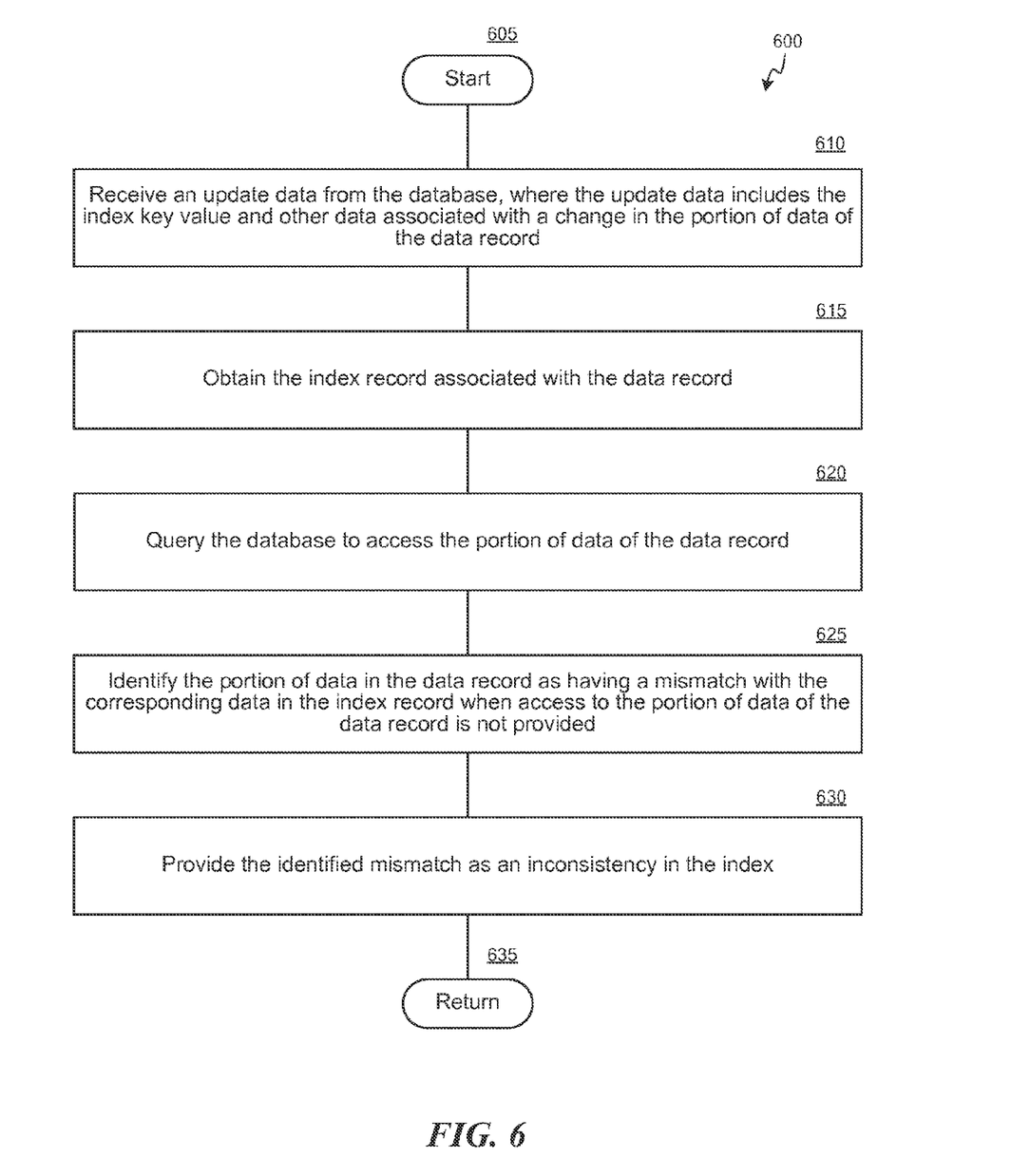
FIG. 6 is a flow chart illustrating a method for identifying an inconsistency in an index when the database storing data associated with the index remains inaccessible.

Turning briefly to FIG. 6, FIG. 6 is a flow chart illustrating a method 600 for identifying an inconsistency in an index. In some embodiments, the method 600 can be performed by the real-time index updater module 304 to identify an inconsistency in an index. The method 600 starts at block 605. At block 610, an update data is received from the database, where the update data includes the index key value and other data associated with a change in the portion of data of the data record.

At block 615, the index record associated with the data record is obtained using the index key value. At block 620, the database (or database table or other sources of the data) is queried to access the portion of data of the data record that has changed. At block 625, the portion of data in the data record is identified as having a mismatch with the corresponding data in the index record when access to the portion of changed data of the data record is not provided. At block 630, any identified mismatch in information stored in the index record to that stored in the data record is flagged as an inconsistency in the index. The method returns at block 635.

Returning to FIG. 3, the real-time index updater module 304 receives data stream that includes information pertaining to modified data records that are not indexed in the RTIM 300. In some embodiments, the real-time index updater module 304 utilizes the index key value, e.g., employee id number, included in the data stream to determine whether any index records corresponding to the index key value is stored in the index storage 308. When no index records corresponding to the index key value are found, the real-time index updater module 304 forwards the data stream to another real-time index updater module 304 in the RTIM 300 maintaining the indexes associated with the modified data records.

In some embodiments, the real-time index updater module 304 forwards the data stream to another RTIM 300 using the various means used by the job thread of the job scheduler module 306b to forward a job request to the appropriate RTIM 300. When the real-time index updater module 304 is unable to forward the data stream to another RTIM 300, in some embodiments, the real-time index updater module 304 provides the data stream to the job queue module 306a to create a job using the information in the data stream and place the job in the job queue. The job threads in the job scheduler module 306b can then be utilized to forward the job when the RTIM 300 is again responsive.

Figure 7:
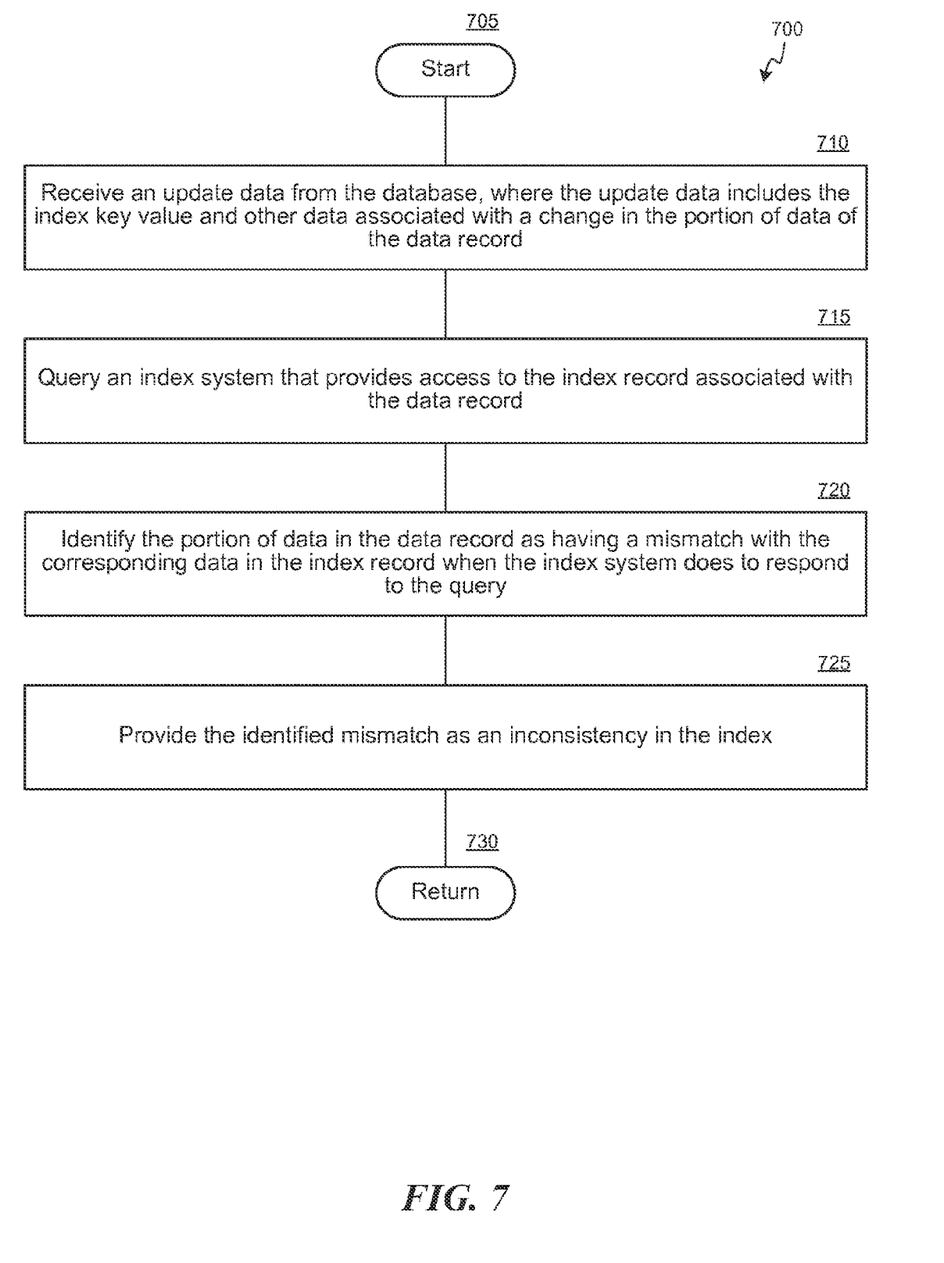
FIG. 7 is a flow chart illustrating a method for identifying an inconsistency in an index when the index system storing the index remains inaccessible.

Turning briefly to FIG. 7, FIG. 7 is a flow chart illustrating a method 700 for identifying an inconsistency in an index. In some embodiments, the method 700 can be performed by the real-time index updater module 304 to identify an inconsistency in an index. The method 700 starts at block 705. At block 710, an update data is received from the database, where the update data includes the index key value and other data associated with a change in the portion of data of the data record.

At block 715, an index system, e.g., RTIM 300, that provides access to the index record associated with the data record is queried. At block 720, the portion of data in the data record is identified as having a mismatch with the corresponding data in the index record when the index system does to respond to the query. At block 725, any identified mismatch in information is flagged as an inconsistency in the index. The method returns at block 730.

Returning to FIG. 3, in some embodiments, the real-time index checker module 306, 216a-216d includes a full-mode index checker that checks and maintains the consistency of data of each and every index record in the various indexes stored in the index storage 308. In some embodiments, the job queue module 306a implements the full-mode index checker by creating a job for each of the index record in the various indexes and placing the jobs in the job queue.

Each such created job includes the index key value from the index record and the identification information of the associated index the index record is part of. The job threads in the job scheduler module 306b perform all the jobs in the job queue and in turn perform a complete check (and any necessary modification) to check and maintain the consistency of data of each and every index record in the various indexes stored in the index storage 308.

Figure 8:
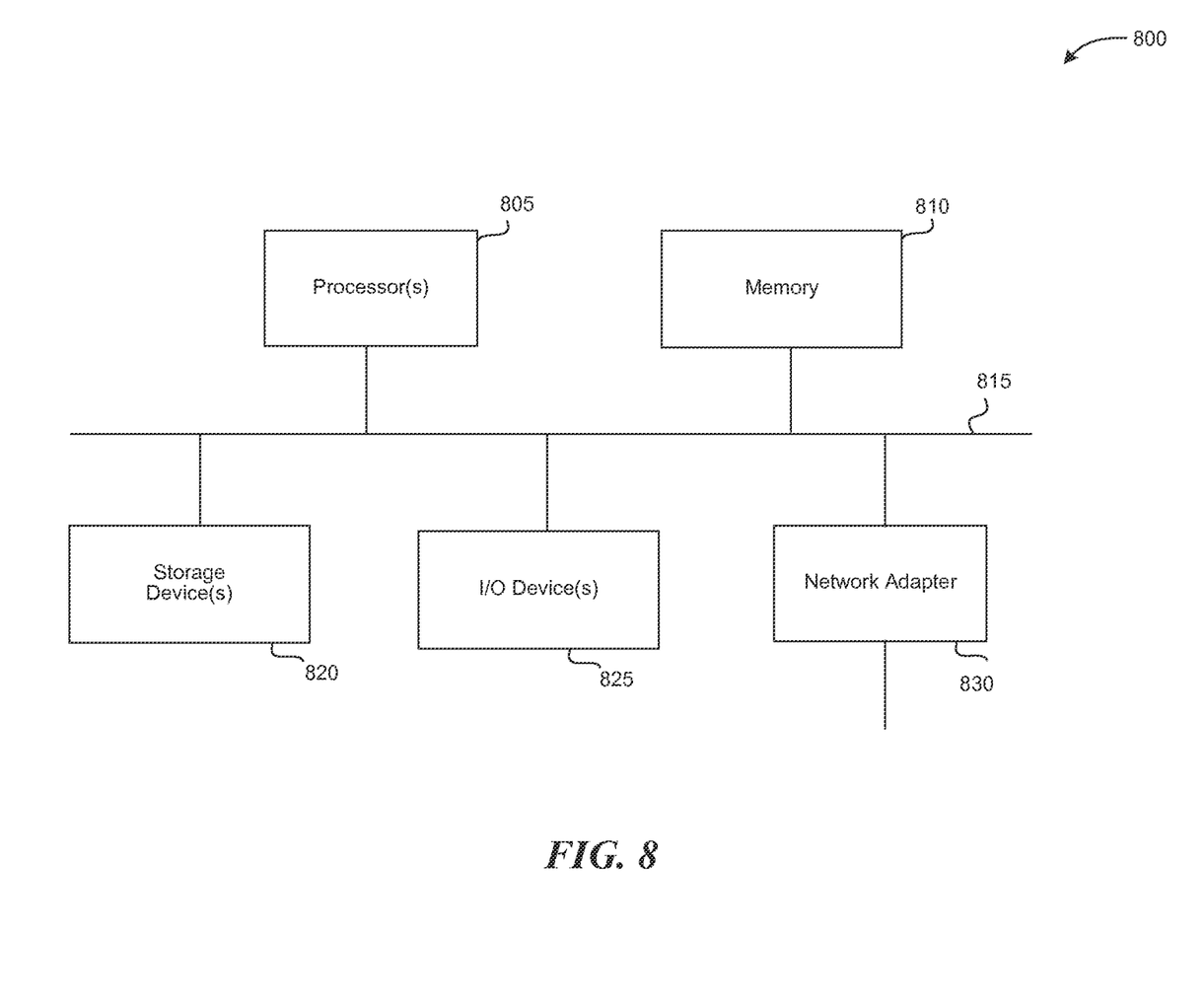
FIG. 8 is a block diagram of a computer system as may be used to implement features of some of the embodiments.

FIG. 8 is a block diagram of a computer system as may be used to implement features of some of the embodiments. The computing system 800 may include one or more central processing units ("processors") 805, memory 810, input/output devices 825 (e.g., keyboard and pointing devices, display devices), storage devices 820 (e.g., disk drives), and network adapters 830 (e.g., network interfaces) that are connected to an interconnect 815. The interconnect 815 is illustrated as an abstraction that represents any one or more separate physical buses, point to point connections, or both connected by appropriate bridges, adapters, or controllers. The interconnect 815, therefore, may include, for example, a system bus, a Peripheral Component Interconnect (PCI) bus or PCI-Express bus, a HyperTransport or industry standard architecture (ISA) bus, a small computer system interface (SCSI) bus, a universal serial bus (USB), IIC (I2C) bus, or an Institute of Electrical and Electronics Engineers (IEEE) standard 1394 bus, also called "Firewire".

The memory 810 and storage devices 820 are computer-readable storage media that may store instructions that implement at least portions of the various embodiments. In addition, the data structures and message structures may be stored or transmitted via a data transmission medium, such as a signal on a communications link. Various communications links may be used, such as the Internet, a local area network, a wide area network, or a point-to-point dial-up connection. Thus, computer readable media can include computer-readable storage media (e.g., "non transitory" media) and computer-readable transmission media.

The instructions stored in memory 810 can be implemented as software and/or firmware to program the processor(s) 805 to carry out actions described above. In some embodiments, such software or firmware may be initially provided to the processing system 800 by downloading it from a remote system through the computing system 800 (e.g., via network adapter 830).

The various embodiments introduced herein can be implemented by, for example, programmable circuitry (e.g., one or more microprocessors) programmed with software and/or firmware, or entirely in special-purpose hardwired (non-programmable) circuitry, or in a combination of such forms. Special-purpose hardwired circuitry may be in the form of, for example, one or more ASICs, PLDs, FPGAs, etc.

Remarks

The above description and drawings are illustrative and are not to be construed as limiting. Numerous specific details are described to provide a thorough understanding of the disclosure. However, in certain instances, well-known details are not described in order to avoid obscuring the description. Further, various modifications may be made without deviating from the scope of the embodiments. Accordingly, the embodiments are not limited except as by the appended claims.

Reference in this specification to "one embodiment" or "an embodiment" means that a particular feature, structure, or characteristic described in connection with the embodiment is included in at least one embodiment of the disclosure. The appearances of the phrase "in one embodiment" in various places in the specification are not necessarily all referring to the same embodiment, nor are separate or alternative embodiments mutually exclusive of other embodiments. Moreover, various features are described which may be exhibited by some embodiments and not by others. Similarly, various requirements are described which may be requirements for some embodiments but not for other embodiments.

The terms used in this specification generally have their ordinary meanings in the art, within the context of the disclosure, and in the specific context where each term is used. Certain terms that are used to describe the disclosure are discussed below, or elsewhere in the specification, to provide additional guidance to the practitioner regarding the description of the disclosure. For convenience, certain terms may be highlighted, for example using italics and/or quotation marks. The use of highlighting has no influence on the scope and meaning of a term; the scope and meaning of a term is the same, in the same context, whether or not it is highlighted. It will be appreciated that the same thing can be said in more than one way. One will recognize that "memory" is one form of a "storage" and that the terms may on occasion be used interchangeably.

Consequently, alternative language and synonyms may be used for any one or more of the terms discussed herein, nor is any special significance to be placed upon whether or not a term is elaborated or discussed herein. Synonyms for certain terms are provided. A recital of one or more synonyms does not exclude the use of other synonyms. The use of examples anywhere in this specification including examples of any term discussed herein is illustrative only, and is not intended to further limit the scope and meaning of the disclosure or of any exemplified term. Likewise, the disclosure is not limited to various embodiments given in this specification.

Without intent to further limit the scope of the disclosure, examples of instruments, apparatus, methods and their related results according to the embodiments of the present disclosure are given below. Note that titles or subtitles may be used in the examples for convenience of a reader, which in no way should limit the scope of the disclosure. Unless otherwise defined, all technical and scientific terms used herein have the same meaning as commonly understood by one of ordinary skill in the art to which this disclosure pertains. In the case of conflict, the present document, including definitions will control.

What is claimed is:

1. A method comprising:
   detecting an inconsistency in an index by performing one or more of:
      first operations comprising:
         receiving a query to access a content stored within a database, the received query including an index key value, wherein the content stored within the database is associated with a data record of multiple data records, the data record being associated with the index key value;
         identifying the index record associated with the index key value;
         comparing data in the data record with corresponding data in the index record and, based on the comparison, identifying a portion of data in the data record as having a mismatch with the corresponding data in the index record; and
         detecting the mismatch as the inconsistency in the index;
      second operations comprising:
         receiving update data from the database, the update data including the index key value and other data associated with a change of a portion of data of the data record;
         obtaining the index record associated with the data record, wherein the obtained index record is associated with the included index key value, the index record being obtained to modify the data corresponding to the portion of data of the data record;
         querying the database to access the portion of data of the data record, wherein the portion of data of the data record is used to modify the corresponding data in the index record;
         identifying the portion of data in the data record as having the mismatch with the corresponding data in the index record when access to the portion of data of the data record is not provided; and
         detecting the identified mismatch as the inconsistency in the index; or
      third operations comprising:
         receiving update data from the database, the update data including the index key value and other data associated with a change of the portion of data of the data record;
         querying an index system providing access to the index record associated with the data record, wherein the index record is associated with the included index key value;
         identifying the portion of data in the data record as having the mismatch with the corresponding data in the index record when the index system does not provide a response to the querying; and
         detecting the identified mismatch as the inconsistency in the index; or
      any combination thereof;
   receiving, by a processor, a data associated with the detected inconsistency in the index, the detected inconsistency being associated with the mismatch between the portion of data in a data record and the corresponding data in the index record, wherein the data record is associated with the database that includes the multiple data records;
   computing the index key value from the received data, the index key value including an index attribute and a value for the index attribute, the index key value being associated with the index record, wherein the index includes multiple index records, wherein the index record includes the index key value and a reference to the data record, the reference employable to access the data record from the database;
   obtaining the index record associated with the computed index key value and the data record associated with the reference included in the index record; and
   maintaining a consistency of the index by modifying the corresponding data in the index record to be consistent with the portion of data in the data record.

2. The method of claim 1, wherein detecting the inconsistency in the index comprises the first operations.

3. The method of claim 1, wherein detecting the inconsistency in the index comprises the second operations.

4. The method of claim 1, wherein detecting the inconsistency in the index comprises the third operations.

5. The method of claim 1, wherein detecting the inconsistency in the index further comprises:
   determining a first subset of index records accessed within a particular timeframe, the first subset of index records including a second subset of index records, wherein each of the second subset of index records is associated with a corresponding detected inconsistency in the index, a total number of the second subset of index records exceeding a predefined threshold;
   identifying each of the first subset of index records as being associated with a potential inconsistency in the index; and
   detecting a particular identified potential inconsistency in the index as the particular inconsistency in the index.

6. The method of claim 1, wherein the modifying the corresponding data in the index record to be consistent with the portion of data in the data record includes any of:
   a deleting the particular index record;
   an adding a particular new index record; or
   a modifying a subset of data in the particular index record.

7. The method of claim 1, wherein a particular index key value is further associated with a particular data record of the multiple data records, wherein the maintaining the consistency of the index of a database is performed using multiple threads, a particular thread of the multiple threads modifying a particular corresponding data in the particular index record to match a portion of the particular data in a particular data record.

8. A system, comprising:
   a processor and memory;
   a component configured to detect an inconsistency in an index of a database by performing one or more of:
      first operations comprising:
         receiving a query to access a content stored within a database, the received query including an index key value, wherein the content stored within the database is associated with a data record of multiple data records, the data record being associated with the index key value;
         identifying an index record associated with the index key value;
         comparing data in the data record with corresponding data in the index record and, based on the comparison, identifying a portion of data in the data record as having a mismatch with the corresponding data in the index record; and detecting the mismatch as the inconsistency in the index;
second operations comprising:
receiving update data from the database, the update data including the index key value and other data associated with a change of a portion of data of the data record;
obtaining the index record associated with the data record, wherein the obtained index record is associated with the included index key value, the index record being obtained to modify the data corresponding to the portion of data of the data record;
querying the database to access the portion of data of the data record, wherein the portion of data of the data record is used to modify the corresponding data in the index record;
identifying the portion of data in the data record as having the mismatch with the corresponding data in the index record when access to the portion of data of the data record is not provided; and
detecting the identified mismatch as the inconsistency in the index; or
third operations comprising:
receiving update data from the database, the update data including the index key value and other data associated with a change of the portion of data of the data record;
querying an index system providing access to the index record associated with the data record, wherein the index record is associated with the included index key value;
identifying the portion of data in the data record as having the mismatch with the corresponding data in the index record when the index system does not provide a response to the querying; and
detecting the identified mismatch as the inconsistency in the index; or
any combination thereof;
a component configured to receive a data associated with the detected inconsistency in the index of the database, the detected inconsistency being associated with the mismatch between the portion of data in the data record and the corresponding data in the index, wherein the data record is associated with the database that includes the multiple data records;
a component configured to compute the index key value using the received data, the index key value associated with the index record, wherein the index includes multiple index records, the index key value including an index attribute and a value for the index attribute;
a component configured to place a job request in a job queue to modify the corresponding data in the index record to match the portion of data in the data record, wherein the job request includes the computed index key value, the job queue including multiple jobs; and
multiple threads to perform the multiple jobs in the job queue, a particular job on the job queue being performed by a particular thread of the multiple threads, wherein the modification of the corresponding data of the index record updates the index or the data record to achieve consistency between the portion of data of the data record and the corresponding data in the index record.

9. The system of claim 8, wherein the particular thread comprises:

a gathering thread that obtains the data record and the index record associated with the computed index key value;
an identifier thread that identifies the portion of data in the data record having a mismatch with the corresponding data in the index record, the identification being performed by comparing a particular data in the data record with a corresponding particular data in the index record; and
a consistency thread that updates the index by modifying the corresponding data in the index record to be consistent with the portion of data in the data record.

10. The system of claim 8, wherein the component configured to detect the inconsistency detects the inconsistency by performing at least the first operations.

11. The system of claim 8, wherein the component configured to detect the inconsistency detects the inconsistency by performing at least the second operations.

12. The system of claim 8, wherein the component configured to detect the inconsistency detects the inconsistency by performing at least the third operations.

13. The system of claim 8, wherein a particular index record includes a particular index key value and a particular reference to a particular data record of the multiple data records, the particular reference being utilized to access the particular data record from the data table.

14. The system of claim 8, wherein the modifying the corresponding data in the index record to match the portion of data in the data record includes any of:
a deleting the particular index record;
an adding a particular new index record; or
a modifying a subset of data in the particular index record.

15. The system of claim 8, wherein the maintaining the consistency of the index of the database is performed using multiple threads, a particular thread of the multiple threads modifying a particular corresponding data in the particular index record to match a portion of the particular data in a particular data record.

16. A non-transitory computer readable storage medium storing computer executable instructions that, when executed by a computing system, cause the computing system to perform operations comprising:
detecting an inconsistency in an index by performing one or more of:
first operations comprising:
receiving a query to access a content stored within a database, the received query including an index key value, wherein the content stored within the database is associated with a data record of multiple data records, the data record being associated with the index key value;
identifying the index record associated with the index key value;
comparing data in the data record with corresponding data in the index record and, based on the comparison, identifying a portion of data in the data record as having a mismatch with the corresponding data in the index record; and
detecting the mismatch as the inconsistency in the index;
second operations comprising:
receiving update data from the database, the update data including the index key value and other data associated with a change of a portion of data of the data record;
obtaining the index record associated with the data record, wherein the obtained index record is associated with the included index key value, the index record being obtained to modify the data corresponding to the portion of data of the data record;

querying the database to access the portion of data of the data record, wherein the portion of data of the data record is used to modify the corresponding data in the index record;

identifying the portion of data in the data record as having the mismatch with the corresponding data in the index record when access to the portion of data of the data record is not provided; and detecting the identified mismatch as the inconsistency in the index; or third operations comprising:

receiving update data from the database, the update data including the index key value and other data associated with a change of the portion of data of the data record;

querying an index system providing access to the index record associated with the data record, wherein the index record is associated with the included index key value;

identifying the portion of data in the data record as having the mismatch with the corresponding data in the index record when the index system does not provide a response to the querying; and detecting the identified mismatch as the inconsistency in the index; or any combination thereof;

receiving data associated with the detected inconsistency in the index, the detected inconsistency being associated with the mismatch between the portion of data in the data record and the corresponding data in the index record, wherein the data record is associated with a database table that includes multiple data records;

determining the index key value from the received data, the index key value including an index attribute and a value for the index attribute, the index key value being associated with the index record, wherein the index includes multiple index records, wherein the index record includes the index key value and a reference to the data record, the reference employable to access the data record from the database table;

obtaining the index record associated with the computed index key value and the data record associated with the reference included in the index record;

and modifying the corresponding data in the index record to be consistent with the portion of data in the data record.

17. The computer readable storage medium of claim 16, wherein detecting the inconsistency in the index comprises the first operations.

18. The computer readable storage medium of claim 16, wherein detecting the inconsistency in the index comprises the second operations.

19. The computer readable storage medium of claim 16, wherein detecting the inconsistency in the index comprises the third operations.

20. The computer readable storage medium of claim 16, wherein modifying the corresponding data in the index record is performed using multiple threads, and wherein a particular thread of the multiple threads modifies a particular corresponding data in the particular index record to match a portion of the particular data in a particular data record.

* * * * *